United States Patent [19]

Hoshihara

[11] Patent Number: 5,112,005
[45] Date of Patent: May 12, 1992

[54] SEAT BELT RETRACTOR
[75] Inventor: Naoaki Hoshihara, Nagoya, Japan
[73] Assignee: Aisin Seiki Kabushiki Kaisha, Japan
[21] Appl. No.: 674,152
[22] Filed: Mar. 25, 1991
[30] Foreign Application Priority Data Mar. 28, 1990 [JP] Japan .................................. 2-80320

[51] Int. Cl.⁵ .......................................... B65H 75/48
[52] U.S. Cl. .................................................. 242/107
[58] Field of Search ................. 242/107, 107.3, 107.5, 242/107.4 R, 107.4 A, 107.4 B, 107.4 C, 107.4 D

[56] References Cited

U.S. PATENT DOCUMENTS

| | | | |
|---|---|---|---|
| 4,088,281 | 5/1978 | Close | 242/107 |
| 4,125,231 | 11/1978 | Henderson | 242/107 |
| 4,216,922 | 8/1980 | Wenan | 242/107 |
| 4,301,977 | 11/1981 | Yang | 242/107 |
| 4,630,841 | 12/1986 | Nishimura et al. | 242/107 X |
| 4,637,630 | 1/1987 | Nishimura et al. | 242/107 X |
| 4,640,472 | 2/1987 | Epple | 242/107.5 X |
| 4,669,680 | 6/1987 | Nishimura et al. | 242/107 |
| 4,844,375 | 7/1989 | Ballest | 242/107.4 B X |
| 4,943,011 | 7/1990 | Kitamura et al. | 242/107 |

FOREIGN PATENT DOCUMENTS 990259 1/1976 Canada ...................... 242/107.4 D
1-73447 5/1989 Japan .

*Primary Examiner*—Daniel P. Stodola
*Assistant Examiner*—John P. Darling
*Attorney, Agent, or Firm*—Finnegan, Henderson, Farabow, Garrett & Dunner

[57] ABSTRACT

A seat belt retractor for reducing the retracting force of a webbing on an occupant, including a casing and a spool rotatably mounted in the casing. A length of the webbing being wound on the spool. A spiral spring connected to the spool biases and rotates the spool in the direction of the winding of the webbing on the spool. A shaft rotatably mounted in the casing engages the spool to provide unitary rotation therebetween. An elastic member connected to the shaft and an inner cylinder engageable with the elastic member reduce the biasing force of the spiral spring when the spool is rotated to retract the webbing.

15 Claims, 5 Drawing Sheets

SEAT BELT RETRACTOR

BACKGROUND OF THE INVENTION

1. Field of the Invention

The present invention relates to a seat belt retractor, and in particular to a seat belt retractor in which the retracting force of a webbing is reduced when the webbing is extended across the upper torso and the pelvic regions of an occupant.

2. Description of the Prior Art

Conventionally, it has been desirous to reduce the force of webbing on an occupant. One of such devices is disclosed in Japanese Utility model Laid-open Print No. 1-73447 which was published on May 17, 1989 without examination. In this device, a pair of spiral springs are connected, via a ratchet mechanism, to a spool on which a webbing is wound. Though the spool is rotated continuously by the spiral springs in the direction of the retraction of the webbing, when the webbing is extracted the ratchet mechanism is operated to isolate one of the spiral springs. Thus, the retracting force applied to the webbing is reduced.

Moreover, the foregoing construction requires a complex arrangement located near the spool and an enlargement of the device in the axial direction of the spool.

SUMMARY OF THE INVENTION

It is, therefore, a principal object of the present invention to provide a seat belt retractor without the foregoing drawback.

Additional object and advantages of the invention will be set forth in part in the description which follows and in part will be obvious from the description or may be learned by practice of the invention. The objects and advantages of the invention may be realized and attained by means of the instrumentalities and combinations particularly pointed out in the appended claims.

In order to attain this object, a seat belt retractor is comprised of a casing, a spool rotatably mounted in the casing, the spool including a length of webbing wound on the spool and a gear portion, spring means connected to the spool for providing a biasing force and for rotating the spool in the direction of the winding of the webbing on the spool to retract the webbing, a shaft rotatably mounted in the casing including pinion means for engaging the gear portion of the spool to provide unitary rotation between the shaft and spool, and compensating means in communication with the shaft for reducing the biasing force of the spiral spring when the spool is rotated in the direction of the winding of the webbing.

It is to be understood that both this general description and the following detailed description are exemplary and explanatory only and are not restrictive of the invention as claimed.

BRIEF DESCRIPTION OF THE DRAWINGS

The accompanying drawings which are incorporated in and constitute a part of the specification illustrate the embodiments of the invention, and together with the description, serve to explain the objects, advantages and principles of the invention.

DETAILED DESCRIPTION OF PREFERRED EMBODIMENTS

Figure 1:
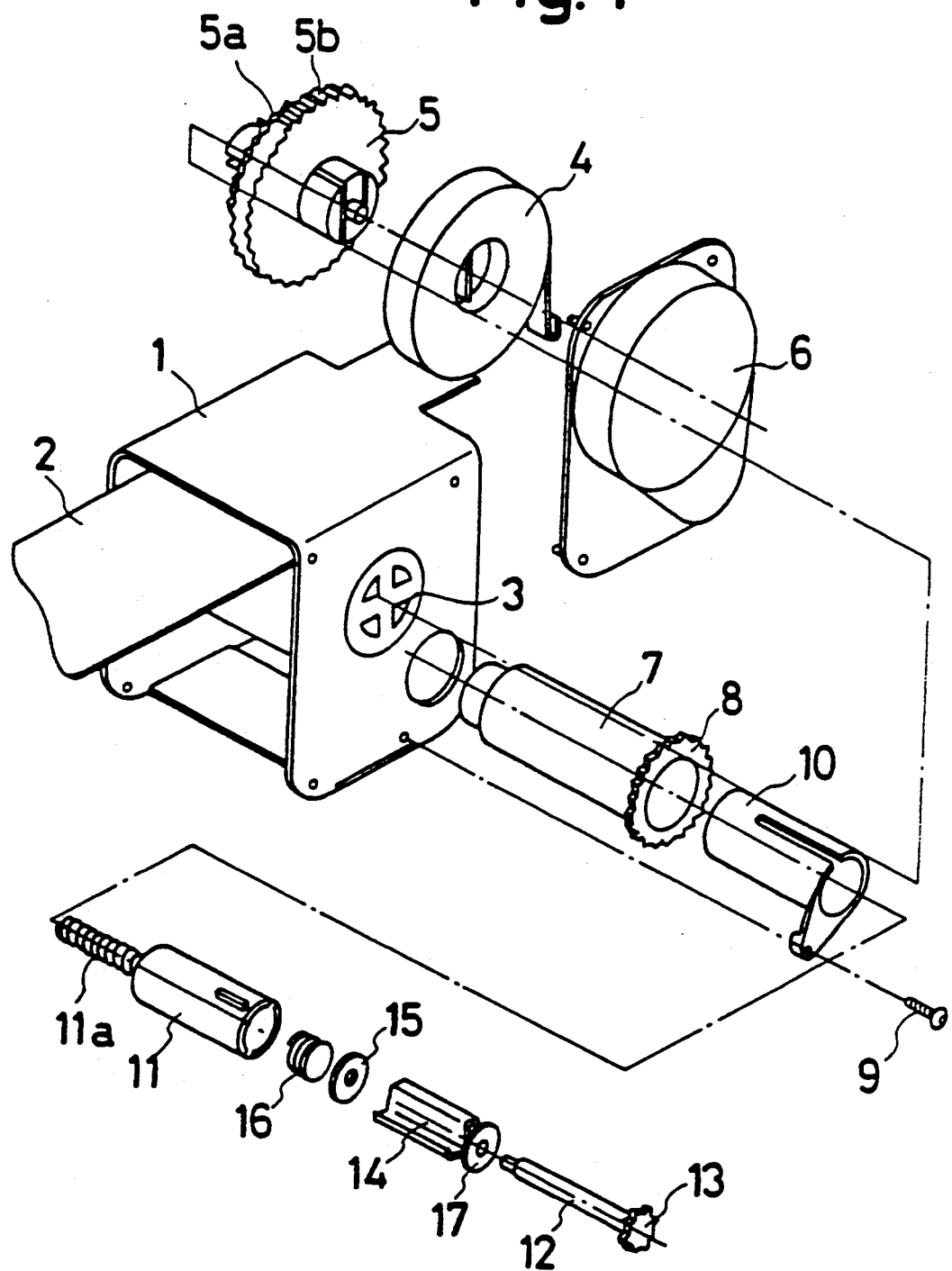
FIG. 1 is an exploded perspective view of a seat belt retractor in accordance with one embodiment of the present invention.
Figure 3:
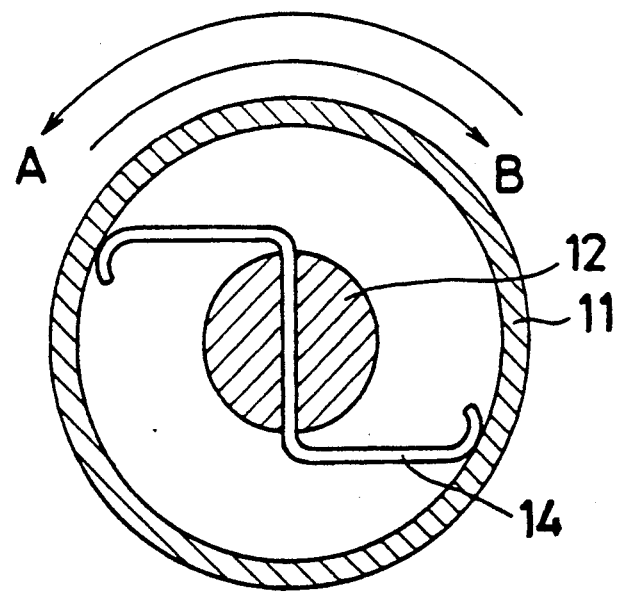
FIG. 3 is a cross sectional view of a portion of the retractor in which elastic means is provided.

Referring now to FIGS. 1 and 3, a seat belt retractor includes a casing 1 which is in the form of an inverted U-shaped configuration. A spool 3 on which a fixed length of webbing 2 is wound is rotatably mounted on the casing 1. At a right side of the casing 1, as viewed in FIG. 1, there is secured a cover 6 in which a spiral spring 4, which acts as a spring means, and a gear 5 are accommodated. The gear 5 is fixedly mounted on a right end portion of the spool 3. Opposite ends of the spring 4 are secured to the gear 5 and the cover 6 respectively so as to urge or bias the spool 3 in the direction of the winding of the webbing 2 on the spool 3.

Within the casing 1, there is accommodated an outer or a first cylinder 7, which is parallel with and rotatable by the spool 3. A pinion 8 is secured on a right end portion of the cylinder 7 and is in continuous mesh engagement with a first geared portion 5a of the gear 5. Within the first cylinder 7, there is inserted a guide member 10 which is secured to the casing 1 by means of a bolt 9. Within the guide member 10, there is provided an inner or a second cylinder 11 which is in the form of a blind bore configuration. The second cylinder 11 is movable in the axial direction without rotation due to the well-known key connection between the second cylinder 11 and the guide member 10. A male thread 11a is formed at a left end portion of the second cylinder 11 and is in mesh engagement with a female thread 7a formed at a left end portion of the first cylinder 7.

A shaft 12 is fitted within the second cylinder 11 so as to be both movable in the axial direction and rotatable. A pinion 13 is secured to a right end portion of the shaft 12 and is engagable with a second geared portion 5b of the gear 5. A leaf spring 14 acting as an elastic means is formed into a crank configuration and is fixedly mounted on the shaft 12. Each distal end of the spring 14 is bent into a curved configuration and is in sliding engagement with an inner surface of the second cylinder 11.

Figure 4:
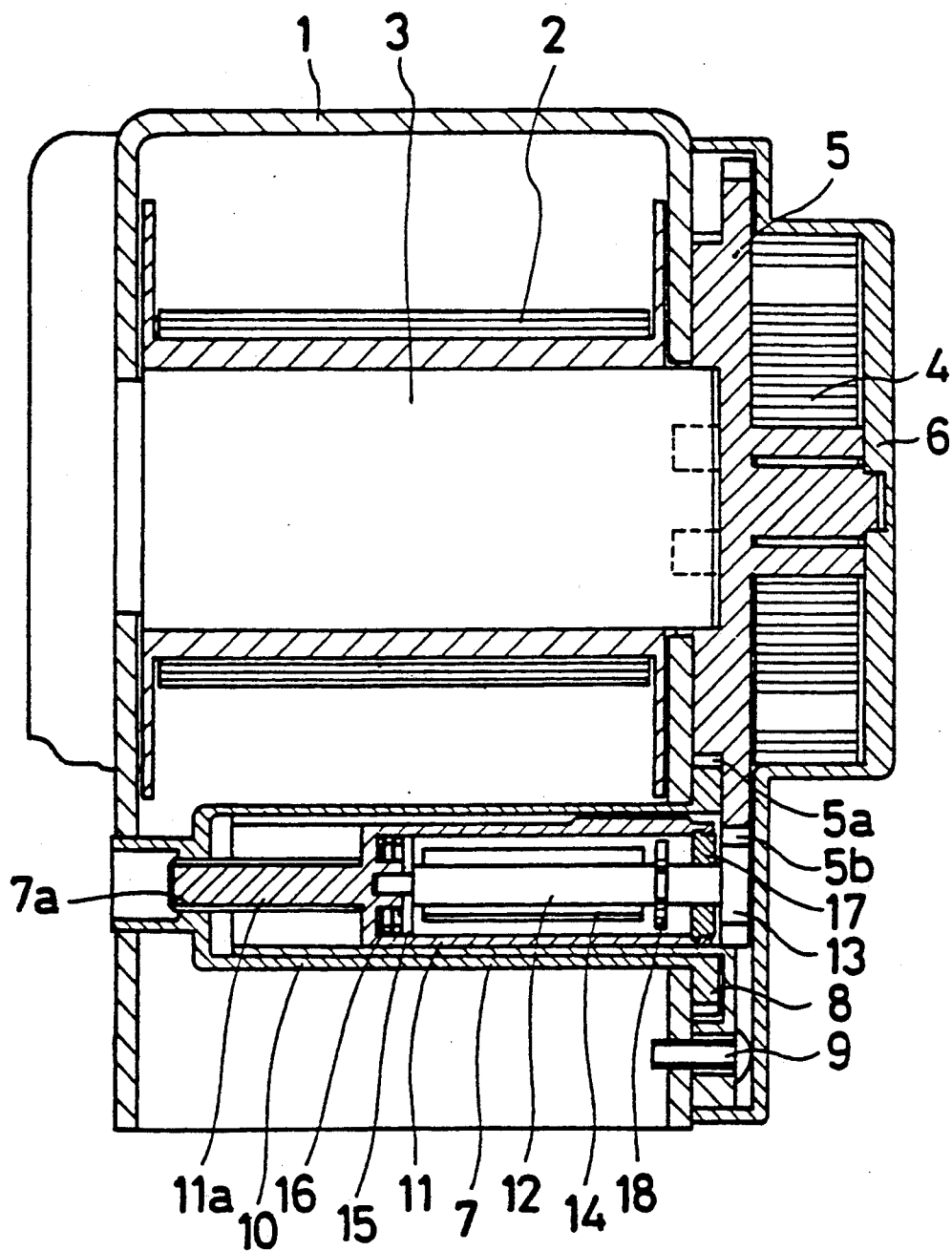
FIG. 4 is a view similar to FIG. 2 but illustrates the condition of the seat belt retractor when a webbing is extracted therefrom.

A coil spring 16 is disposed between the second cylinder 11 and a plate 15 which is on a left end portion of the shaft 12 so as to urge the shaft 12 in the rightward direction, as shown in FIG. 4. A cap 17 is secured to a right end portion of the second cylinder 11 to be engaged with a plate 18 shown in FIG. 4, secured on the shaft 12 which results in the prevention of the extraction of the shaft 12 from the second cylinder 11.

Figure 2:
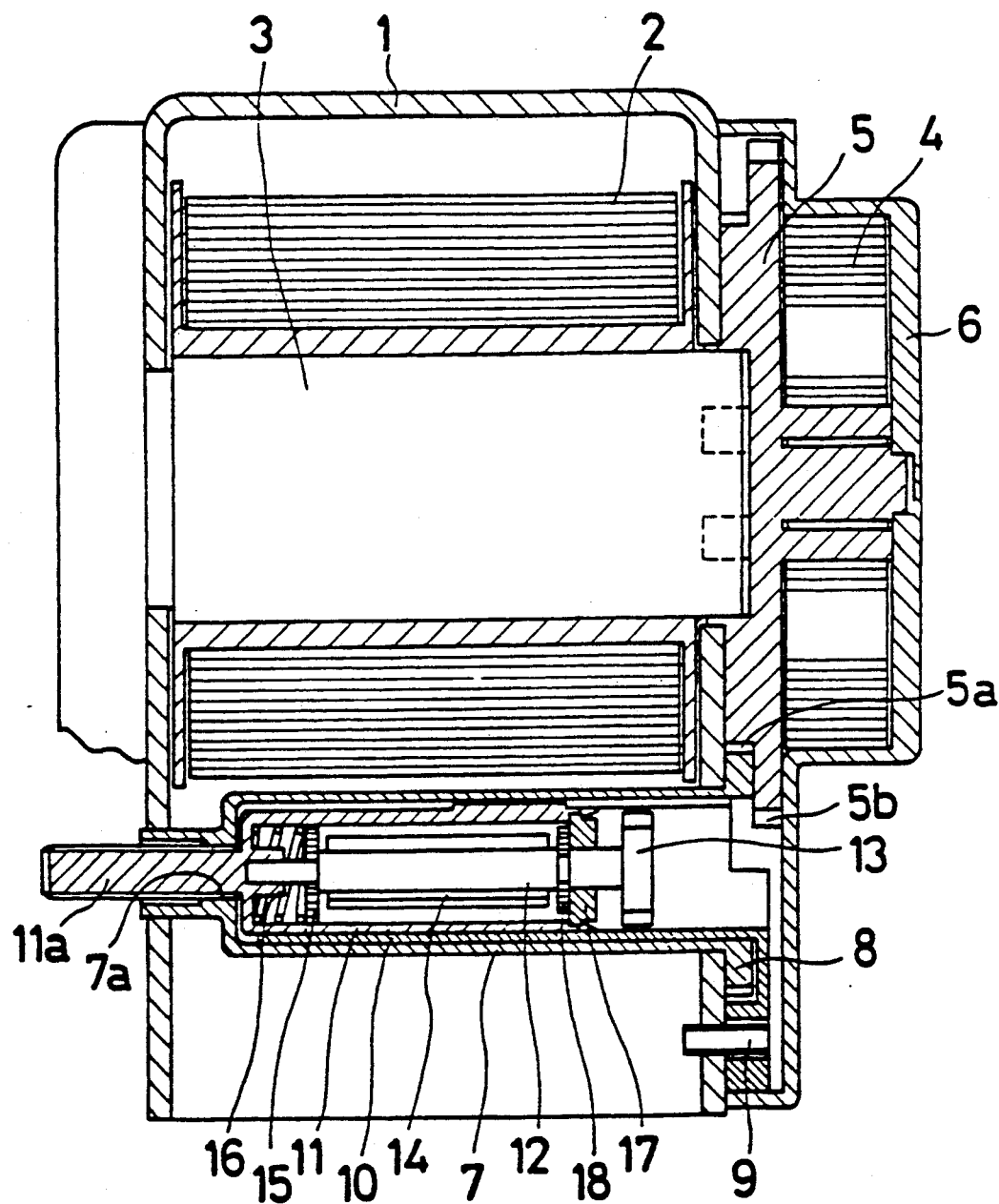
FIG. 2 is a cross-sectional view of the seat belt retractor shown in FIG. 1.

In operation, in a rest condition of the seat belt retractor as shown in FIG. 2, the webbing 2 is fully wound on the spool 3. When the webbing 3 is extracted by an occupant (not shown), the gear 5 is rotated together with the spool 3 against the biasing force of the spiral spring 4. This results in the rotation of the first cylinder 7 due to the fact that the first geared portion 5a of the gear 5 is in mesh engagement with the pinion 8. The resulting rotation of the first cylinder 7 is converted into the axial movement of the shaft 12 in the rightward direction due to the meshing engagement between cylinders 7,11 and the aforementioned key connection. Thus, a use condition as shown in FIG. 4 is established. Despite illustration, it is easily understood that in this condition the webbing 2 is adapted to extend across the upper torso and the pelvic portion of the occupant. Upon establishment of the foregoing use condition, the gear 5 is brought into mesh engagement with the pinion 8. This engagement is assured by the urging force of the coil spring 16 in the rightward direction. This engagement is designed to be concluded prior to use by the occupant who has minimum bodily constitution.

Under this condition, the spool 3 is apt to be rotated retracting the webbing 2 by the force of the spiral spring 4 as well as the shaft 12 is apt to be rotated in a direction 'A' due to the engagement between gears 8,13 in such a manner that distal ends of the leaf spring 14 are rotated for obtaining stronger sliding engagement between the leaf spring 14 and the inner surface of the second cylinder 11. This means that a part of the retracting force of the spiral spring 4 is compensated by the foregoing engagement between the leaf spring 14 and the inner surface of the second cylinder 11. Thus, the sense of oppression on the occupant can be softened upon adaptation of the webbing 3.

If the extraction of the webbing 3 is continued despite the completion of the engagement between the gear 5 and the pinion 13, the extraction of the webbing 3 can be performed without any trouble or difficulty. The reason is that under such condition the shaft 12 is rotated in the direction of 'B' in such a manner that the distal ends of the leaf spring 14 are disposed away from the inner surface of the second cylinder 11.

Under the use condition shown in FIG. 4, when the webbing 2 is released, the spool 3 is rotated in the reverse direction by the retracting force of the spiral spring 4. The resulting rotation of the spool 3 moves the second cylinder 11 and shaft 12 in the leftward direction, thereby disengaging the pinion 13 from the gear 5. Thus, the webbing 2 is rapidly rewound onto the spool 3, returning to the rest condition shown in FIG. 2.

Figure 5:
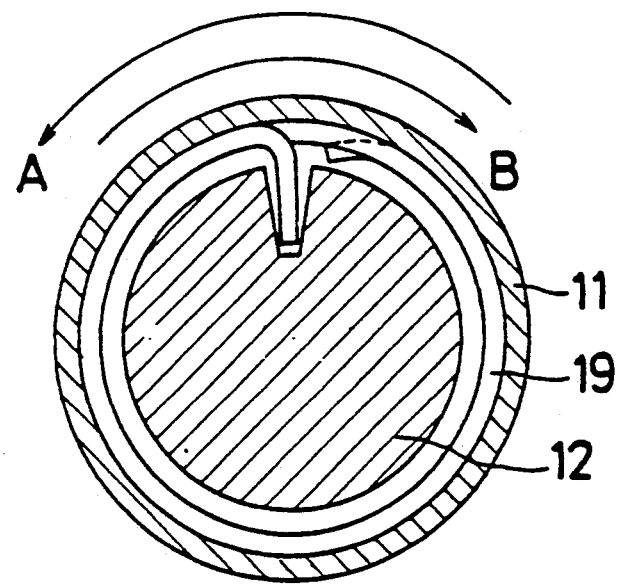
FIG. 5 is a modification of the construction shown in FIG. 3.

It should be noted that instead of the leaf spring 14 shown in FIG. 3 a coil spring 19 can be used as shown in FIG. 5. The coil spring 19 is, as a whole, arranged within the second cylinder 11 so as to be in sliding engagement with the inner surface thereof and is secured at its one end to the shaft 12.

Other embodiments of the invention will be apparent to those skilled in the art from consideration of the specification and practice of the invention disclosed herein. It is intended that the specification be considered exemplary only, with a true scope and spirit of the invention being indicated by the following claims.

What is claimed is:

1. A seat belt retractor, comprising:
   a casing;
   a spool rotatably mounted in the casing, including a length of webbing wound thereon and a gear portion;
   spring means connected to the spool for providing a biasing force and rotating the spool in the direction of the winding to retract the webbing;
   an inner cylinder disposed in the casing, the inner cylinder including an inner surface;
   a shaft rotatably mounted in the inner cylinder, including pinions means for engaging the gear portion of the spool to provide unitary rotation of the shaft and spool; and
   an elastic member connected to the shaft and engageable with the inner surface of reducing the biasing force of the spring means at times when the spool is rotated in the direction of the winding of the webbing.

2. A seat belt retractor according to claim 1 further comprising clutch means in communication with the spool and shaft for establishing engagement and disengagement therebetween.

3. A seat belt retractor according to claim 2 wherein the clutch means includes an outer cylinder rotated by the spool, a guide member accommodated within the outer cylinder, the inner cylinder being axially movable within the guide member, wherein when the shaft and the spool are engaged upon rotation of the spool in the direction of the winding of the webbing, the inner cylinder is moved in an axial direction within the guide member.

4. A seat belt retractor according to claim 1 further including an auxiliary spring disposed within the inner cylinder for urging the shaft toward the spool.

5. A seat belt retractor according to claim 4 wherein the auxiliary spring is a coil spring.

6. A seat belt retractor according to claim 1 wherein the spring means is a spiral spring.

7. A seat belt retractor according to claim 1 wherein the elastic member is a leaf spring.

8. A seat belt retractor according to claim 1 wherein the elastic member is a coil spring.

9. A seat belt retractor comprising:
   a casing;
   a spool rotatably mounted in the casing;
   a length of webbing wound on the spool;
   spring means connected to the spool for biasing and rotating the spool in the direction of the winding of the webbing on the spool to retract the webbing;
   an inner cylinder disposed in the casing, the inner cylinder including an inner surface;
   a shaft rotatably mounted in the inner cylinder and engageable with the spool for providing unitary rotation therebetween;
   an elastic member connected to the shaft and engageable with the inner surface for reducing the biasing force of the spring means at times when the spool is rotated in the direction of the winding of the webbing; and
   clutch means in communication with the spool and shaft for establishing engagement and disengagement therebetween.

10. A seat belt retractor according to claim 9 wherein the spring means is a spiral spring.

11. A seat belt retractor according to claim 9 wherein the elastic member is a leaf spring.

12. A seat belt retractor according to claim 9 wherein the elastic member is a coil spring.

13. A seat belt retractor according to claim 9, wherein the clutch means includes an outer cylinder rotated by the spool, a guide member accommodated within the outer cylinder, and an inner cylinder axially movable within the guide member, wherein the inner cylinder is moved in an axial direction within the guide member when the shaft and the spool are engaged, upon rotation of the spool in the direction of the winding of the webbing.

14. A seat belt retractor according to claim 13 further including an auxiliary spring disposed within the inner cylinder for urging the shaft toward the spool.

15. A seat belt retractor according to claim 14 wherein the auxiliary spring is a coil spring.

* * * * *